United States Patent Office 2,927,083
Patented Mar. 1, 1960

2,927,083

PROCESS FOR THE PREPARATION OF SILICA GEL AND SILICA AEROGELS

Ralph F. Nickerson, Marblehead, Mass., assignor to Monsanto Chemical Company, St. Louis, Mo., a corporation of Delaware No Drawing. Application April 11, 1955
Serial No. 500,667

13 Claims. (Cl. 252—317)

The present invention relates to silica sols and silica gels, and it more particularly relates to a process of controlling the residual acidity or basicity of silica aerogels produced from silica sols.

It has been proposed heretofore in U.S. Patent No. 2,285,449 to Morris D. Marshall issued June 9, 1942 to prepare silica aerogels from acidic mixed hydro-organo silica sols. According to this patent, a silica hydrosol having a pH of about 4 is first prepared from an aqueous solution of sodium silicate and an aqueous solution of mineral acid such as sulfuric acid. This sol thus contains relatively large amounts of the sodium salt of the mineral acid. The addition of a water-miscible organic liquid such as ethanol causes substantial amounts of such salt to precipitate. Upon removal of the precipitated salt, a hydro-organo sol is obtained which is considerably more stable to gelation than the initial hydrosol. Also, such hydro-organo sol may be used commercially to produce aerogels by removal of the liquid phase without permitting shrinkage of the intermediate gel which is formed on heating. This patent mentions that the pH of the sol may be adjusted up to a pH of about 6 by neutralization with an alkali such as sodium hydroxide dissolved in alcohol or other organic solvent.

However, it has been found that it is extremely difficult to produce silica aerogels having a consistent residual acidity or basicity when the pH of the hydro-organo sols is adjusted by the use of alkali such as sodium hydroxide. Moreover, the addition of an alkali to the sol results in the formation of small gel lumps in the sol which later appear in the aerogel produced therefrom in the form of white specks. This detracts from the uniformity of the aerogel. Further, when aerogels are produced from the sols on a large scale, portions of the aerogel product will differ from other portions in the amount of residual acidity or basicity.

It is also a disadvantage when a fixed alkali is used in the pH adjustment of an acidic sol that a non-volatile salt is formed in situ. This salt is then present in the aerogel produced from the sol and may impair the usefulness of the aerogel in those applications where a very low salt content aerogel is required.

Accordingly, it is one object of this invention to provide hydro-organo sols and processes of producing aerogels which do not have the disadvantages enumerated above.

It is a further object of this invention to provide an acidic silica sol which may be converted to silica aerogels having the desired amount of residual acidity or basicity. It is a further object of this invention to provide a process of producing silica aerogels having a desired amount of residual acidity or basicity which can be controlled with substantial consistency on a commercial scale operation.

Still further objects and advantages of this invention will become apparent from the following description and the appended claims.

The silica aerogel producing process of this invention is carried out, in general, by first forming an acidic silica sol having a relatively low electrolyte content. There is then incorporated in the sol a water-soluble, neutral or substantially neutral, thermally decomposable organic ammonia liberating compound such as urea. The amount of such compound used is dependent on the residual acidity or basicity desired in the aerogel produced from the sol. The sol is next converted to a gel and the liquid phase is removed without subjecting the gel to compressive forces which would cause appreciable shrinkage of the gel.

The starting acidic silica sols employed in this invention may be prepared according to the processes described in U.S. Patent No. 2,285,477 to John F. White, patented June 9, 1942. The process of this patent comprises first forming an acidic silica aquasol having a pH between 1.8 and 4.5 by acidifying a water-soluble alkali silicate such as sodium silicate with a mineral acid such as sulfuric acid, in the proper proportions. This sol is cooled to cause precipitation of the salt formed by the reaction of the silicate and the acid, and the precipitated salt is then removed from the sol. The process of the White patent also provides for the addition of about 0.5 to 25% by weight of the sol of a water-miscible organic liquid such as ethanol prior to cooling to facilitate the precipitation of further quantities of salt. Thus, the process of the White patent provides acidic silica aquasols or acidic silica hydro-organo sols. The latter have a relatively low salt content of about 0.1 to 2% by weight depending on the amount of organic liquid used prior to cooling. Such silica hydro-organo sols may be used directly in the preparation of aerogels after incorporating therein the ammonia liberating compounds of this invention. The silica hydro-organo sols produced in accordance with the process of the Marshall patent hereinbefore referred to may be used in a similar manner.

The acidic silica aquasols of the White process usually contain more than 2% and up to about 6% by weight of the salt formed from the reaction of the silicate and acid. This salt content is too high for conversion of the silica aquasol to an aerogel and the salt content must be reduced to the point where the sol contains less than 0.001% by weight of metallic cations. This is suitably accomplished by passing the aquasol through a bed of water-insoluble cation-exchange material operating on the hydrogen cycle to remove metallic cations from the sol. If desired, the sol may then be passed through a bed of anion-exchange material to remove anions from the sol, but this step is not essential provided the pH of the sol is at least 1.5.

Suitable acidic silica aquasols may also be prepared by passing a water-soluble alkali metal silicate through a bed of water-insoluble cation-exchange material operating on a hydrogen cycle until an acidic silica aquasol containing less than 0.001% of metallic cations is obtained. In general, this result may be achieved by collecting that portion of the effluent which is obtained before the break through point of the bed is reached. The break through point is reached when the bed fails to adsorb the metallic cations passing through the bed.

The acidic silica sols employed in this invention may contain varying amounts of silica and electrolyte or salt, and the pH may be varied considerably depending primarily on the end use of the sols. However, when the sols are used for making aerogels, it is preferred to employ acidic sols which contain between about .4 and 15% by weight of silica, as $SiO_2$, about 0.001 to 3% by weight of salt or electrolyte and have a pH between about 1.5 and 4.5, the balance consisting essentially of water or a mixture of water and a water-miscible organic liquid having a boiling point below that of water. In the case of acidic silica aquasols, which have a liquid phase consisting of water, it is preferred to use those sols which have from about 5 to 15% by weight of silica, less than 0.001% by weight of metallic cations, and a pH of about 1.5 to 3. In the case of acidic silica hydro-organo sols, it is preferred to use those sols which have from about 4 to 12% by weight of silica, from about 0.001 to 2% by weight of electrolyte or salt and a pH of about 2 to 4.

In a preferred form of this invention, the starting acidic silica sols are acidic silica hydro-organo sols which are prepared by reacting an aqueous solution of sodium silicate and aqueous sulfuric acid at a temperature between about 0 and 15° C. in such proportions and concentrations to provide an acidic silica aquasol having a pH of about 2 to 4 and containing sodium sulfate and from about 12 to 20% by weight of $SiO_2$ as silicic acid. The silica aquasols having more than 17% by weight of $SiO_2$ generally must be kept at 0–5° C. to prevent rapid gelation.

The silica aquasol thus obtained is maintained at a temperature of about 0 to 15° C. and a water-miscible organic liquid such as ethanol is mixed therewith to form a silica hydro-organo sol containing from about 25 to 60% by weight of the organic liquid and from about 4 to 11% by weight of $SiO_2$ as silicic acid. The sodium sulfate is substantially insoluble in the above sol and thus precipitates from the sol to a substantial extent. On removal of this $Na_2SO_4$ by centrifugation, filtration or the like, a sol is obtained which contains about 0.1 to 0.6% by weight of $Na_2SO_4$. The amount of $Na_2SO_4$ in the sol depends primarily on the concentration of the organic liquid in the sol and the temperature of the sol.

The water-miscible organic liquid employed may have a boiling point below or above that of water at atmospheric pressure in those instances where the sol is to be used, for example, in the treatment of textiles or paper. For example, the higher boiling water-miscible liquids such as diethylene glycol, ethylene glycol, glycerine, 2-ethoxyethanol, methoxymethanol, 2-butoxyethanol, monomethyl ether of diethylene glycol, monoethyl ether of diethylene glycol or monobutyl ether of diethylene glycol or the like may be employed in such instances. However, if the sols are to be employed to produce aerogels, it is desirable to employ water-miscible organic liquids, preferably those consisting of carbon, hydrogen and oxygen atoms, which have a boiling point below that of water at atmospheric pressure. As examples of such liquids may be mentioned methanol, ethanol, isopropanol, tertiary butyl alcohol, acetone or the like. The preferred organic liquids or diluents are ethanol and acetone.

The ammonia liberating compound may be incorporated in the acidic sol at any stage of the preparation of such sols. However, such compound is preferably incorporated in the sol after the sol has been prepared and the salt or electrolyte has been removed to the extent desired. This may be accomplished by adding the ammonia liberating compound to the sol, and allowing it to dissolve in the sol. The ammonia liberating compound is present in the sols as a homogeneous solution. Stirring may be used if desired to facilitate dissolution of the compound and homogeneity of the sol. The ammonia liberating compound does not react with the sol at normal temperatures, for example, temperatures between about 0° and 50° C., and thus does not alter the pH and consequently the stability of the sol at such temperatures. Moreover, such compound does not form gel particles in the sol. As the sol is heated at higher temperatures, the sol forms a gel having a liquid phase comprising a homogeneous solution of the ammonia liberating compound. Such compound decomposes at elevated temperatures releasing ammonia and a volatile or thermally decomposable organic compound. The ammonia reacts with all or part of the mineral acid residue of the sol forming the ammonium salt of such acid, and thus neutralizes part or all of the acid residue of the gel depending on the amount of ammonia liberating compound used. When the gel is heated at temperatures above 250° C., the ammonium salts of the mineral acids are largely decomposed, and if the vapors from the gel are allowed to escape from the gel such ammonium salts escape in part with the vapor thus providing a gel which does not have appreciably more salt content than the sol from which it is prepared.

The quantity of ammonia liberating compound added to the sol can be regulated as desired to produce gels or aerogels having a desired acid residue content, or to produce gels or aerogels which are essentially neutral, that is, have no residual acid content. Because the ammonia from the compound is not liberated until the sol has gelled, no gel is formed prematurely in the sol and the gel is of uniform composition. The ammonia liberated in the gel is liberated uniformly and the gel is uniformly neutral or has a uniform residual acid content, if such is desired, throughout the gel structure.

The quantity of ammonia liberating compound used can be varied widely depending upon the amount of ammonia liberated by such compound, the acidity of the sol, and also whether a neutral or acid gel or aerogel is desired. In general, the quantity used is equivalent to or in excess of the amount of ammonia required to neutralize the sol to a pH of about 3.55. However, if the sol has a pH above 3.55 and below 4.5, the minimum amount of ammonia liberating compound required is only about one-quarter to one-half of that of a sol having a pH below 3.55. Excesses of ammonia liberating compound may be used, but usually an excess of more than 200% of the equivalent amount of ammonia required to bring the sol to a pH of 3.55 is not necessary. Ordinarily, the amount of ammonia liberating compound used is quite small, for example, about 0.005 to about 0.15% by weight based on the sol. Amounts of about 0.01 to 0.1% by weight are preferred.

The water-soluble, neutral or substantially neutral, thermally decomposable organic ammonia liberating compounds employed in this invention are preferably those compounds which liberate ammonia on heating at a temperature below 300° C. and above 50° C., particularly a temperature between about 80 and 300° C. As examples of compounds which may be used may be mentioned formamide, acetamide, thiourea, hexamethylene tetramine, urea and the like. The preferred compound is urea because of its low cost and its suitability for the objects of this invention.

In the preparation of silica aerogels wherein the acidic silica sols containing the ammonia liberating compounds are heated in a pressure-resistant vessel, the sols are usually charged to a pressure-resistant vessel and then heated. The sol is first converted to a gel in situ by the heating. The removal of the liquid phase from the gel is next carried out without subjecting the gel to a substantial compressive liquid-solid interface, for example, as in the process of U.S. Patent No. 2,093,454 to Samuel S. Kistler, patented September 21, 1937.

In carrying out the removal of the liquid phase from the gel formed in situ, it is necessary to heat the gel in a closed zone or system, in which the pressure may be controlled as desired, for example, in an autoclave, until the temperature of the vapor of the liquid phase of the gel is from slightly below to slightly above the critical temperature of the liquid phase. The temperature of the gel is raised until it is at least at the temperature where substantially all of the liquid phase of the gel has been converted to a vapor, and thereafter the vapor may be released slowly from the closed system without injuring the gel structure or without causing appreciable shrinkage of the gel. This temperature may vary from about 30° C. below the critical temperature to above the critical temperature of the liquid phase of the gel, depending on the particular organic liquid and concentration thereof present in the liquid phase of the gel. The temperature is then maintained or raised, as desired, while releasing vapor slowly until essentially all of the vapor is released from the closed system. Although the temperature may be as much as 30° C. below the critical temperature of the liquid phase of the gel in some instances, satisfactory results may be obtained at such a temperature. On the other hand, some shrinkage of the gel does occur, and it is preferred to avoid this shrinkage by operating at least at the critical temperature of the liquid phase of the gel. Higher temperatures may also be used, for example, temperatures up to about 500° C., but it is preferred not to exceed a temperature of about 450° C.

In general, the sols and gels of this invention have physical properties which are very similar to the sols and gels of the prior art. However, the sols are distinctive from those of the prior art in that after application to a surface and heating to a temperature sufficiently high to liberate ammonia from the ammonia liberating compound contained therein, a silica residue having a uniform desired residual acid content or a uniform desired neutral pH throughout the residue is obtained. The silica residue is also free of white gel lumps or specks. This result is not attainable by partially or completely neutralizing the acidic sols of the prior art with a fixed alkali. Also, the sols are readily converted to gels or aerogels having a uniform desired residual acid content or a uniform desired neutrality by heating such sols until they gel and ammonia is liberated from the ammonia liberating compound. The gels thus produced are free of white gel lumps or specks which are formed when fixed alkalis are used for partial or complete neutralization of the acidic sols. The gels produced in accordance with this invention may be made so that they are free or substantially free of electrolyte, that is, salt and acid, by starting with an acidic silica sol which is free or substantially free of salt.

A further understanding of the sols and processes of the present invention will be obtained from the following specific examples which are intended to illustrate the invention, but not to limit the scope thereof, parts and percentages being by weight unless otherwise specified.

*Example 1*

Two-hundred and twenty gallons of an acidic silica ethanol-aquasol containing 9.6% of $SiO_2$ as silicic acid, a pH of 3.15 due solely to residual sulfuric acid, an ethanol content of 50%, a $Na_2SO_4$ content of 0.3% and the remainder consisting of water, were treated with 420 grams of urea. The temperature of the sol was 20° C. This amount of urea corresponded to an amount of ammonia which was 75% in excess of the amount of ammonia required to raise the pH of the alcosol to 3.55. After the urea had dissolved, a homogeneous solution of the urea in the alcosol was obtained without the formation of gel lumps or a change in pH or residual sulfuric acid content of the sol. The stability of the sol at temperatures of 0 to 70° C. was not affected as compared to the original sol at the same temperature.

A portion of the sol was applied to a glass plate and then dried and heated to a temperature of 200° C. for a period of about 30 minutes to form a silica gel film having a uniform acid content and no distinctive white gel lumps or specks. The acid number of the silica residue was 1.05, and this value was uniform throughout the residue. The acid number of a silica residue produced from the original alcosol was 4.4. This acid number is too high for most purposes.

The bulk of the alcosol containing the urea was charged to an autoclave until 75% of the volume of the autoclave was occupied by the sol. The autoclave was then closed and heated until a pressure of 1900 pounds per square inch gauge (which was slightly above the critical pressure) was attained, during which time the sol was converted to an ethanol-aquagel in situ. Heating was continued and ethanol-water vapor was released intermittently for the autoclave to maintain the pressure at 1900 pounds per square inch gauge until a temperature of 300° C. was attained. This temperature was above the critical temperature of the liquid phase of the ethanol-aquagel. The vapor in the autoclave was released slowly until substantially all of the vapor was removed, and the autoclave was then cooled. A silica aerogel of excellent quality was obtained. This aerogel was free of white gel lumps or specks and had a uniform acid number of 1.05 throughout the entire batch. The aerogel did not contain appreciably more salt than was present in the alcosol from which it was prepared.

An aerogel produced in the same manner from the original alcosol (without urea) had an acid number of 4.4, which is too high for most commercial uses of silica aerogels. Moreover, the high acidity of the starting sol caused considerable corrosion of the autoclave.

An aerogel produced in the same manner from the original alcosol (without urea) adjusted to a pH of 3.7 with sodium bicarbonate or sodium hydroxide contained white gel lumps or specks which gave the aerogel a non-uniform appearance. Also, the acid number of various portions of the aerogel in the batch was not uniform and varied by as much as 0.5. The aerogel contained more salt than was present in the starting alcosol before addition of sodium bicarbonate thereto.

The term "acid number" as referred to throughout this disclosure is intended to mean the number of milligrams of KOH required to neutralize one gram of silica xerogel or aerogel to a pH of 5.2. This acid number of a silica xerogel or silica aerogel is suitably determined by thoroughly mixing 4 grams of dry silica xerogel or aerogel with 100 milliliters of distilled water and then titrating the resulting suspension with 0.01 N sodium hydroxide to a pH of 5.2 as measured by glass electrodes which have been previously standardized against an aqueous buffer solution at a pH of 4.0. The acid number is calculated by the following equation:

$$\frac{\text{Millileters of NaOH solution} \times N \times 0.0561 \times 1000}{4}$$

=milligrams of KOH per gram of silica xerogel or silica aerogel, or acid number

*Example 2*

Two-hundred and twenty gallons of an acidic silica alcosol containing 9.6% of $SiO_2$ as silicic acid, a pH of 3.25 due solely to residual sulfuric acid, an ethanol content of 50%, a $Na_2SO_4$ content of 0.3% and the remainder consisting of water were treated with 300 grams of urea. This amount of urea corresponded to an amount of ammonia which was 75% in excess of that needed to raise the pH of alcosol to 3.55. The temperature of the sol was 20° C. After a homogeneous solution of the urea in the alcosol was obtained, the sol was autoclaved to produce an aerogel using the procedure described in Example 1. A silica aerogel of excellent quality was obtained. This aerogel was free of white gel lumps or specks and had an acid number of 0.98 which was uniform throughout the batch. The salt content of the aerogel was not appreciably higher than the salt content of the sol from which it was prepared. The acid number of a silica aerogel prepared from the starting silica alcosol (without urea) was 3.2.

*Example 3*

Two-hundred and twenty gallons of an acidic silica alcosol containing 9.6% of $SiO_2$ as silicic acid, a pH of 3.1 due solely to residual sulfuric acid, an ethanol content of 50%, a $Na_2SO_4$ content of 0.3% and the remainder consisting of water were treated with 240 grams of urea. This amount of urea corresponded to an amount of ammonia required to increase the pH of the alcosol to 3.55. The temperature of the sol was 20° C. After a homogeneous solution of the urea in the alcosol was obtained, the sol was autoclaved to produce an aerogel using the procedure described in Example 1. A silica aerogel of excellent quality was obtained. This aerogel was free of white gel lumps or specks and had an acid number of 1.7 which was uniform throughout the batch. The salt content of the aerogel was not appreciably higher than the salt content of the sol from which it was prepared.

The acid number of a silica aerogel prepared from the starting silica alcosol (without urea) was 5.1.

*Example 4*

A silica aerogel was prepared as described in Example 2, with the exception that the starting silica alcosol contained less than 0.01% of $Na_2SO_4$. The aerogel thus obtained was similar to that produced according to Example 2, but had an electrolyte content, that is, salt and acid, below 0.1% and was particularly suitable as a reinforcing filler for silicone gums in the preparation of electrical grade silicone rubbers.

*Example 5*

Acidic silica sols and silica aerogels were prepared contained urea as described in Examples 1 through 4, with the exception that methanol and acetone, respectively, were substituted for the ethanol in the starting sols of these examples. The products and results obtained were similar to those described in Examples 1 through 4.

*Example 6*

Results similar to those described in Examples 1 through 5 were obtained by substituting formamide, thiourea and hexamethylene tetramine, respectively, for urea, but using an amount of such compound which would liberate an amount of ammonia equivalent to that liberated by urea under the heating conditions described in these examples.

*Example 7*

A solution of sodium silicate was first prepared by dissolving 720 pounds of sodium silicate containing about 8.9% $Na_2O$ and about 29% $SiO_2$ in about 314 pounds of water. The resulting solution was then mixed by intensive stirring or agitation with a solution consisting of 106 pounds of 100% $H_2SO_4$ dissolved in 233 pounds of water. During the mixing the temperature of the resulting solution was maintained at about 15° C. by suitable cooling coils. When the mixing was completed the sol was cooled to 0° C. and held at this temperature until the crystallization of salt as $$Na_2SO_4 \cdot 10H_2O$$

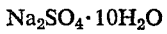

was substantially complete. This required about 10 minutes. The crystals of salt were then removed from the sol by centrifugation. The sol contained about 18.7% of $SiO_2$ as silicic acid, about 0.4% of $H_2SO_4$, about 3.2% of $Na_2SO_4$ and the remainder consisting substantially of water. This acidic silica aquasol was stable for 3 hours at 25° C. and for 12 hours at 0° C.

The acidic silica aquasol at a temperature of 5° C. was first passed through a sand filter and then downwardly by gravity flow through a bed of the hydrogen form of water-insoluble beads of a copolymer of styrene and divinyl benzene, which copolymer contained nuclear sulfonic acid groups, and had a capacity of 4.25 M.e. (milligram equivalent) per gram, until the sol contained less than 0.001% of sodium ions. The effluent from the column was substantially free of sodium and ferric ions as evidenced by the fact that it gave a negligible flame test for sodium and very little coloration of an acid thiocyanate solution.

The effluent as obtained above was passed through a bed of the basic form of "Amberlite IR 45" (a weak anion-exchange material consisting of a water-insoluble styrene-divinyl benzene copolymer containing a plurality of polyalkylamine groups) and having a capacity of 6.0 M.e. per gram, until the collected effluent had a pH of 3.15. This collected effluent at a temperature of 5° C. was then treated with sufficient urea to correspond to an amount of ammonia 75% in excess of that required to neutralize the sol to a pH of 3.55.

The acidic silica aquasol containing the urea was charged to an autoclave until it occupied 75% of the volume of the autoclave. The autoclave was then heated until a pressure of 3600 pounds per square inch (gauge) was attained, during which time the sol was converted to a silica hydrogel in situ. Heating was continued and water vapor was released intermittently from the autoclave to maintain the pressure at 3600 pounds per square inch (gauge) until a temperature of 400° C. was attained. The water vapor in the autoclave was then released slowly and the autoclave was cooled. A silica aerogel of good quality was obtained. This product was free of white specks or gel lumps and had a uniform acid number of about 1.0 throughout the batch. The aerogel also contained less than 0.1% of electrolyte.

A very important advantage of this invention is in the production of silica aerogels of uniform quality and acid number on a commercial scale from silica hydro-organo sols. In the past it has been customary to produce a batch of silica hydro-organo sols of low electrolyte content in excess of 100 gallons and suitable for charging to one autoclave. When using a fixed alkali for controlling the final acidity of the silica aerogel produced from such sol, it has been necessary to add such alkali just before the autoclaving step because the addition of the fixed alkali materially decreases the stability of the sol toward gelation and thus introduces the danger that the sol may convert to a gel before it can be pumped to the autoclave. Further, it was difficult to produce a batch of silica aerogel which would not only be uniform in acid number within such batch, but which would have the same acid number as another batch. By the process of this invention, it is possible to prepare large batches of silica hydro-organo sols by the single addition of ammonia liberating compound, which batch may then be charged in increments to two or more commercial size autoclaves without producing gel lumps therein or without affecting the stability of the sol. This ability to produce a single large batch with one addition of ammonia liberating compound which batch may then be charged to a considerable number of autoclaves, as required, over an 8 hour to 12 hour period, results in more uniform products and in considerable economies as compared to the preparation of individual batches for each autoclave.

What is claimed is:

1. A process of preparing a silica gel which comprises incorporating a water-soluble, substantially neutral, thermally decomposable organic ammonia liberating compound in an acidic silica sol having a silica content of about 4 to 15% by weight as a dispersed phase, a continuous liquid phase comprising water and about 0.001 to 3% by weight of a salt dissolved in said liquid phase, said compound being homogeneously dissolved in said liquid phase in an amount of about 0.005 to about 0.15% by weight based on the sol, raising the temperature of said sol until said sol forms a gel but below the temperature at which said compound decomposes and heating said gel to liberate ammonia from said compound.

2. A process of preparing a silica gel which comprises incorporating from about 0.005 to about 0.15% by weight of a water-soluble, substantially neutral, thermally decomposable organic ammonia liberating compound in an acidic silica aquasol having a pH of about 1.5 to 4.5, a silica content of about 4 to 15% by weight and a dissolved salt content of about 0.001 to 3% by weight, said compound being homogeneously dissolved in said sol, raising the temperature of said sol until said sol forms a gel but below the temperature at which said compound decomposes and heating said gel to liberate ammonia from said compound.

3. A process as in claim 2, but further characterized in that said compound is urea.

4. A process of preparing silica aerogels which comprises incorporating from about 0.005 to about 0.15% by weight of a water-soluble, substantially neutral, thermally decomposable organic ammonia liberating compound in an acidic silica aquasol having a pH of about 1.5 to 4.5, a silica content of about 5 to 15% by weight and containing less than 0.001% by weight of metallic cations, said compound being homogeneously dissolved in said aquasol heating said sol in a closed system to convert it to an aquagel in situ but at a temperature below that at which said compound decomposes, heating said aquagel to a temperature sufficiently high to liberate ammonia from said compound and without subjecting said aquagel to a substantial compressive liquid-solid interface until all of the water phase of the gel has been converted to a vapor and separating said vapor from the resulting gel.

5. A process as in claim 4, but further characterized in that said compound is urea.

6. A process of preparing a silica gel which comprises incorporating from about 0.005 to about 0.15% by weight of a water-soluble, substantially neutral, thermally decomposable organic ammonia liberating compound in an acidic silica hydro-organo sol having a pH of about 1.5 to 4.5, a silica content of about 4 to 15% by weight and a dissolved salt content of about 0.001 to 3% by weight said compound being homogeneously dissolved in said sol, raising the temperature of said sol until it forms a gel but below that temperature at which said compound decomposes and heating said gel to liberate ammonia from said compound.

7. A process as in claim 6, but further characterized in that said compound is urea.

8. A process of preparing silica aerogels which comprises incorporating from about 0.005 to 0.15% by weight of a water-soluble, substantially neutral, thermally decomposable organic ammonia liberating compound in an acidic silica hydro-organo sol having a pH of about 2 to 4, a silica content of about 4 to 11% by weight, a dissolved salt content of about 0.1 to 0.6% by weight and a liquid phase composed of water and from about 25 to 60% by weight, based on the sol, of a water-miscible organic liquid having a boiling point below that of water at atmospheric pressure, said compound being homogeneously dissolved in said sol heating said sol in a closed system to convert it to a hydro-organo gel but at a temperature below that at which said compound decomposes, heating said gel to a temperature sufficient to liberate ammonia from said compound and without subjecting said gel to a substantial compressive liquid-solid interface until all of the liquid phase of said gel has been converted to a vapor and separating said vapor from the resulting gel.

9. A process as in claim 8, but further characterized in that said organic liquid is methanol.

10. A process as in claim 8, but further characterized in that said organic liquid is acetone.

11. A process as in claim 8, but further characterized in that said compound is urea.

12. A process as in claim 8, but further characterized in that said organic liquid is ethanol.

13. A process as in claim 12, but further characterized in that the ammonia liberating compound is urea.

References Cited in the file of this patent

UNITED STATES PATENTS

| | | |
|---|---|---|
| 2,276,314 | Kirk | Mar. 17, 1942 |
| 2,285,449 | Marshall | June 9, 1942 |
| 2,285,477 | White | June 9, 1942 |
| 2,338,089 | Bond | Jan. 4, 1944 |